(12) United States Patent
Falk

(10) Patent No.: US 9,118,643 B2
(45) Date of Patent: Aug. 25, 2015

(54) AUTHENTICATION AND DATA INTEGRITY PROTECTION OF TOKEN

(75) Inventor: Rainer Falk, Erding (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 13/504,874

(22) PCT Filed: Sep. 28, 2010

(86) PCT No.: PCT/EP2010/064313
§ 371 (c)(1),
(2), (4) Date: Apr. 27, 2012

(87) PCT Pub. No.: WO2011/051064
PCT Pub. Date: May 5, 2011

(65) Prior Publication Data
US 2012/0213368 A1 Aug. 23, 2012

(30) Foreign Application Priority Data
Oct. 29, 2009 (DE) .......................... 10 2009 051 201

(51) Int. Cl.
*H04K 1/00* (2006.01)
*H04L 29/06* (2006.01)
(Continued)

(52) U.S. Cl.
CPC ................ *H04L 63/08* (2013.01); *G06F 21/31* (2013.01); *G06F 21/64* (2013.01); *G06Q 20/341* (2013.01);
(Continued)

(58) Field of Classification Search
None
See application file for complete search history.

(56) References Cited

U.S. PATENT DOCUMENTS 6,510,517 B1 * 1/2003 Bruhnke et al. ............... 713/168
7,805,528 B2 * 9/2010 Park et al. ..................... 709/229
(Continued)

FOREIGN PATENT DOCUMENTS

CN 101032117 A 9/2007
CN 101263503 A 9/2008
(Continued)

OTHER PUBLICATIONS

"Infineon ORIGA™ Original Product Authentication and Brand Protection Solution—SLE 95050"; Apr. 2009; 5 pp.; printed Apr. 17, 2009 from www.infineon.com/cms/en/product/promopages/origa/index.html.
(Continued)

*Primary Examiner* — Dede Zecher
*Assistant Examiner* — Richard McCoy
(74) *Attorney, Agent, or Firm* — Staas & Halsey LLP

(57) ABSTRACT

In deriving a cryptographic key from the response message in a challenge-response message in a challenge-response authentication, a checksum for the related response is calculated after receiving a challenge message and before the related response has been transferred. A cryptographic key is derived from the response, which is used to determine the cryptographic checksum. The cryptographic checksum is transferred in a first time period after receiving the challenge message. The response message is transferred during a later, second time period. The duration of validity of the key derived from the response message ends before the response message is transferred. A theoretical attacker who can overhear and manipulate the communication will not know the response message until a point in time when the cryptographic key which can be derived therefrom is already no longer valid.

18 Claims, 2 Drawing Sheets

(51) Int. Cl.
 G06F 21/31 (2013.01)
 G06F 21/64 (2013.01)
 G06Q 20/34 (2012.01)
 G07F 7/08 (2006.01)
 G07F 7/12 (2006.01)
 H04L 9/32 (2006.01)

(52) U.S. Cl.
 CPC *G07F 7/082* (2013.01); *G07F 7/12* (2013.01); *H04L 9/3236* (2013.01); *H04L 9/3271* (2013.01); *H04L 63/0492* (2013.01); *H04L 2209/56* (2013.01); *H04L 2209/805* (2013.01)

(56) References Cited

U.S. PATENT DOCUMENTS

| | | | |
|---|---|---|---|
| 8,645,694 | B2 | 2/2014 | Schrijen et al. |
| 8,654,694 | B2 * | 2/2014 | Chang et al. ............ 370/311 |
| 2002/0078350 | A1 * | 6/2002 | Sandhu et al. ............ 713/168 |
| 2003/0204743 | A1 | 10/2003 | Devadas et al. |
| 2004/0222878 | A1 | 11/2004 | Juels |
| 2007/0252675 | A1 * | 11/2007 | Lamar ............ 340/5.64 |
| 2007/0300293 | A1 * | 12/2007 | Tsutsui et al. ............ 726/5 |
| 2008/0209214 | A1 | 8/2008 | Schrijen et al. |
| 2008/0229392 | A1 * | 9/2008 | Lynch ............ 726/4 |
| 2008/0256600 | A1 * | 10/2008 | Schrijen et al. ............ 726/2 |
| 2008/0276092 | A1 * | 11/2008 | Eberhardt et al. ............ 713/175 |
| 2012/0300889 | A1 * | 11/2012 | Hann et al. ............ 375/362 |
| 2013/0005273 | A1 * | 1/2013 | Kips et al. ............ 455/67.11 |

FOREIGN PATENT DOCUMENTS

| | | |
|---|---|---|
| DE | 102009051201.2 | 10/2009 |
| WO | 01/80479 A1 | 10/2001 |
| WO | 2005/112459 A1 | 11/2005 |
| WO | 2006/134563 A2 | 12/2006 |

OTHER PUBLICATIONS

K. Finkenzeller; RFID-Handbuch: Grundlagen und praktische Anwendungen induktiver Funkanlagen, Transponder und kontaktloser Chipkarten, Chapter 8 Datensicherheit, Jan. 2002, pp. 225-231.

A. Menezes et al., "Other Hash Function Properties and Applications, Keyed Hash Functions (MACS), Data Integrity and Message Authentication, Classification and Framework", Handbook of Applied Cryptography, CRC Press Series on Discrete Mathematics and Its Applications; Jan. 1997; pp. 330, 331, 352, 353 and 359-364.

Menezes et al.; Handbook of Applied Cryptography, CRC Press Series on Discrete Mathematics and Its Applications; Jan. 1977; pp. 400-405, 490, 498 and 499.

International Search Report for PCT/EP2010/064313; mailed Feb. 3, 2010.

Chinese Office Action mailed Feb. 19, 2014 in corresponding Chinese Application No. 201080048683.8.

* cited by examiner

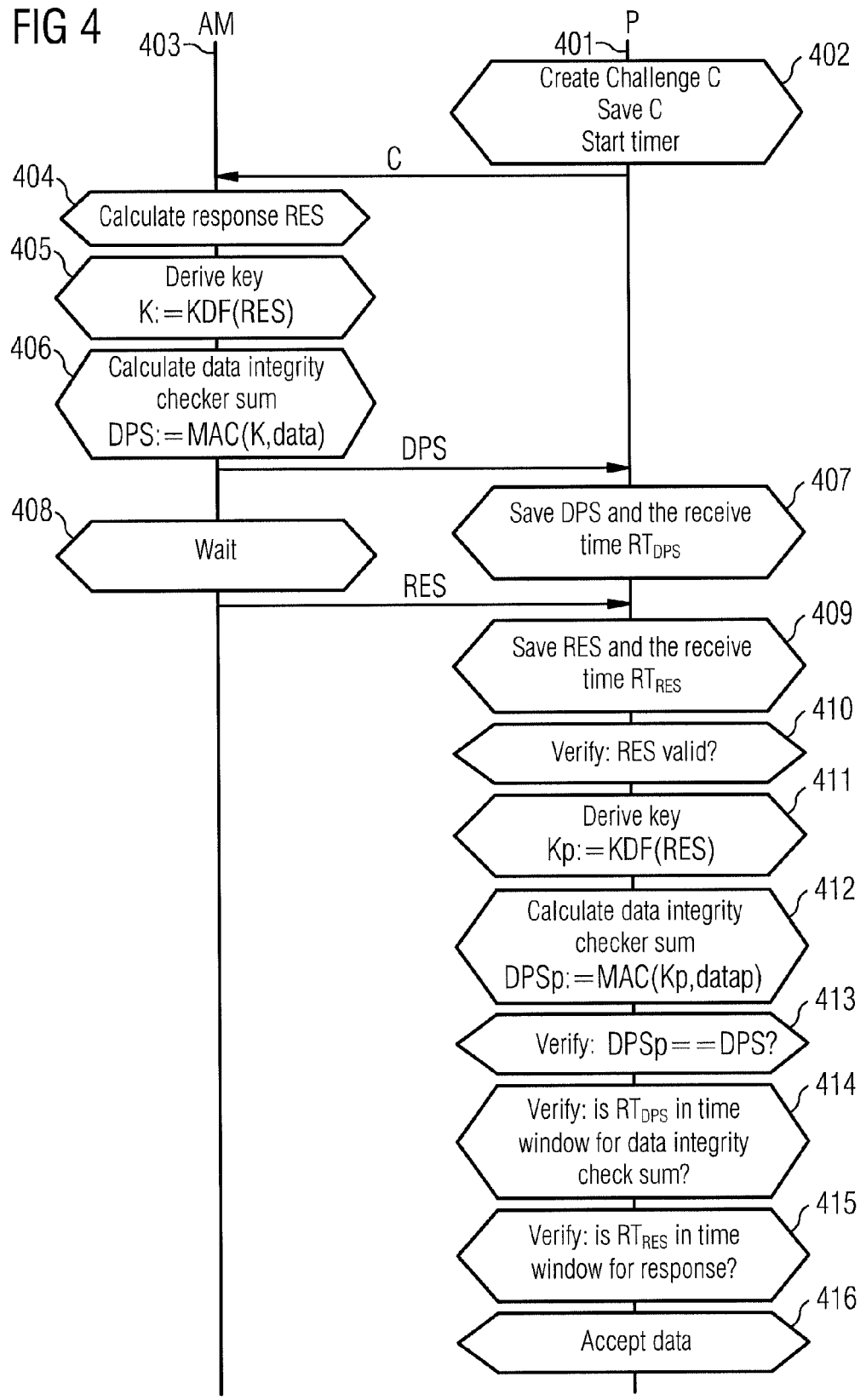

AUTHENTICATION AND DATA INTEGRITY PROTECTION OF TOKEN

CROSS REFERENCE TO RELATED APPLICATIONS

This application is the U.S. national stage of International Application No. PCT/EP2010/064313, filed 28 Sep. 2010 and claims the benefit thereof. The International Application claims the benefits of German Application No. 102009051201.2 filed on Oct. 29, 2009, both applications are incorporated by reference herein in their entirety.

BACKGROUND

Described below is a method for authentication of at least one token using a challenge-response protocol and for protection of the integrity of data stored on the token, using a symmetrical key. Also described is a system having a verifying entity for authentication of at least one token, making use of a challenge-response protocol and for protecting the data integrity of data stored on the token, making use of a symmetrical key.

Using RFID (radio frequency identification), it is possible to equip labels or tags with a chip which can be read contactlessly. RFID tags are used, above all, for marking goods. Furthermore, identification documents for access control and cards for payment systems can be equipped with RFID tags. A distinction is drawn between active and passive RFID tags. Active RFID tags possess a dedicated power supply, whereas passive RFID tags have no dedicated power supply. Passive RFID tags are supplied with energy by an electromagnetic field emitted from an RFID reading device. Usually, an RFID tag has a memory with a plurality of addressable memory units. The RFID reading device for reading out the data stored on the RFID tag has a pre-determined standard instruction set for access to the memory units of the RFID tag. Using the two commands "Read" and "Write", data on the memory RFID tag can be read therefrom or data can be written thereto. Using these known RFID tags, it is only possible to write data into a data store of the RFID tag or out of the data store. Increasingly, however, sensitive data is held ready on an RFID tag, for example, in electronic passports, access control cards or in applications for plagiarism protection. Unauthorized reading of the data from an RFID tag of this type absolutely must be prevented for data protection and safety reasons. By contrast with data carriers having contact-dependent interfaces, with RFID tags, the data is transmitted wirelessly, so that there is a danger of unnoticed reading of data.

A measure for protecting against unauthorized reading is two-sided authentication of RFID tag and reading device in order to prevent an unauthorized user (or hacker) tapping into the data communication unnoticed and thus being able to read out data that is critical to security. It can also thereby be ensured that the data being read out originates from a non-manipulated RFID tag. In some applications such as, for example, plagiarism protection, one-sided authentication of the RFID tag, wherein only the genuineness of the RFID tag is tested by the reading device, is sufficient.

For authenticity checking, an authentication function, for example, by a challenge-response method, is implemented. In a challenge-response method, for authentication of the RFID tag by the RFID reading device, a random challenge is generated and sent to the RFID tag. The RFID tag calculates the response belonging to the challenge by a secret key and sends this response back to the RFID reading device. The RFID reading device then checks the response received by the RFID tag for correctness. The challenge-response protocol is designed such that only the RFID tag which possesses the right secret key is able to calculate the correct response. It is not possible for a hacker, by knowledge of pairs of associated challenge and response, to determine the secret key.

Known, for example, is the Origa chip from Infineon (www.infineon.com/origa), which converts the challenge-response protocol with asymmetric cryptography. For this purpose, the Origa chip uses a private cryptographic key to calculate the associated response message after receiving a challenge message. The validity of the response message is checked by the reading device using an associated public key.

There is also a need to transmit data stored on a token of this type with manipulation protection. However, it is an essential framework condition in RFID-based data communication that the simplest and fastest possible data communication takes place between the RFID reading device and the transponder. This is due firstly thereto that the transponder typically has little resources, that is, both little energy resources and little resources for storage and calculation, so that given a corresponding protocol, the smallest possible data quantities should be evaluated and the smallest possible data traffic should take place. Secondly, a protocol of this type should also be carried out as rapidly as possible, since very often, particularly in the case of dynamic RFID-based data communication systems, the transponder lies within the range of action of the respective RFID reading device for only a short time. Within this short time, a data communication connection must be established and authenticated and the manipulation-protected data exchange must take place. However, the previously known solutions require the RFID tag to have relatively complex hardware, due to the calculation-intensive encryption and the complex key-agreement protocol.

SUMMARY

Against this background, a method and a system are provided for authentication and for data integrity protection of a token ensuring both the greatest possible security and the smallest possible effort in terms of hardware.

Accordingly, a method is provided for authentication of at least one token using a challenge-response protocol and for protecting the integrity of data stored on the token, making use of a symmetrical key. Firstly, a challenge is generated by a verifying entity and is transmitted to the token either wirebound or wirelessly. The token determines a response, based on the challenge transmitted and a first secret key assigned to the token. A symmetrical key is derived with a key derivation function from the determined response. The token determines a data integrity checksum from the data stored on the token with the aid of the symmetrical key. The data integrity checksum is transferred in a first checking time window and the response is transferred to the verifying entity in a second checking time window, so that the first checking time window is chronologically earlier than the second checking time window. On the basis of the data integrity checksum and the response, the RFID tag is authenticated and the data integrity is checked by the verifying entity. The calculation of the response appropriate to a received challenge can be carried out by an asymmetric or a symmetric cryptographic method.

The concept is to derive a cryptographic key from the response message in the context of a challenge-response authentication. After receipt of a challenge message, the appropriate response is calculated, but initially not sent. From the response, a cryptographic key is derived which is used to determine a cryptographic checksum from data. The cryptographic checksum is transmitted in a first time period after receipt of the challenge message. The response message, however, is transmitted during a later, second time period. The validity duration of the key derived from the response message ends before the response message is transmitted. The response message only becomes known to a potential hacker who is able to listen to and manipulate the communication at a time point when the cryptographic key derived therefrom is no longer valid.

Advantageously, a very easily realizable protection of data from an authentication token is made possible. Rather than a cryptographic function realized in a complex manner, such as a digital signature or a session key-agreement protocol, a cryptographic checksum is determined. The missing cryptographic functionality of a session key-agreement protocol is compensated for by a defined chronological behavior which can be realized extremely easily, for example, as a digital (counter) circuit. Particularly advantageous is the use of the method in an authentication module, for example, the Origa chip, which is authenticated with an asymmetric cryptographic method in which no session key is provided and which is unable to calculate a digital signature.

A token or security token includes, without restricting the general nature of the expression, a hardware component which stores at least one item of identification information and/or safety information in order to authenticate a user or a device. Usually, this identification information includes a user identity (e.g. name, date of birth, address, town) or a device identity (e.g. manufacturer, model/type, version information, batch number, serial number, production date, shelf life). Usually, this safety information includes some secret information, such as a password or a PIN or biometric features of the user. Together with the possession of the token, this safety information is drawn upon for authenticating the user. The token can be realized in different forms, for example as a chip card, as a USB stick or a memory card. Furthermore, the token can have different interfaces which are configured, for example, as a chip card interface, a USB interface, a memory card interface (SD card, MMC card) or as a wireless interface. The interface can also be available in the form of a magnetic strip or as a machine readable zone.

The system has a verifying entity for authenticating at least one token, using a challenge-response protocol and for protecting the integrity of data stored on the token, whilst using a symmetrical key, wherein the token and the verifying entity carry out the method described below.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 4 is a flow diagram of the method described below.

DETAILED DESCRIPTION OF THE PREFERRED EMBODIMENT

Figure 1:
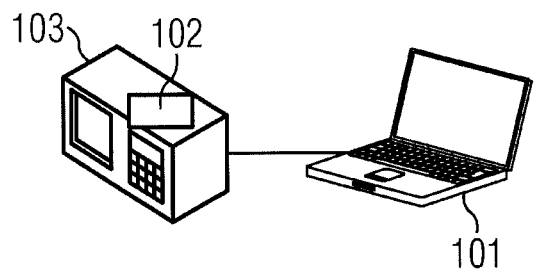
FIG. 1 is a graphic representation of a system having a wire-bound connection between a verifying entity and an authentication token.

Reference will now be made in detail to the preferred embodiments, examples of which are illustrated in the accompanying drawings, wherein like reference numerals refer to like elements throughout.

FIG. 1 shows a system having a wire-bound connection between a verifying entity and an authentication token. In this exemplary embodiment, the verifying entity is a laptop computer 101 which is connected, for example, via a serial interface, at least indirectly, to the authentication token. The authentication token 102 is included in a device 103, for example, a control system and connected via the device 103 to the laptop computer 101.

Figure 2:
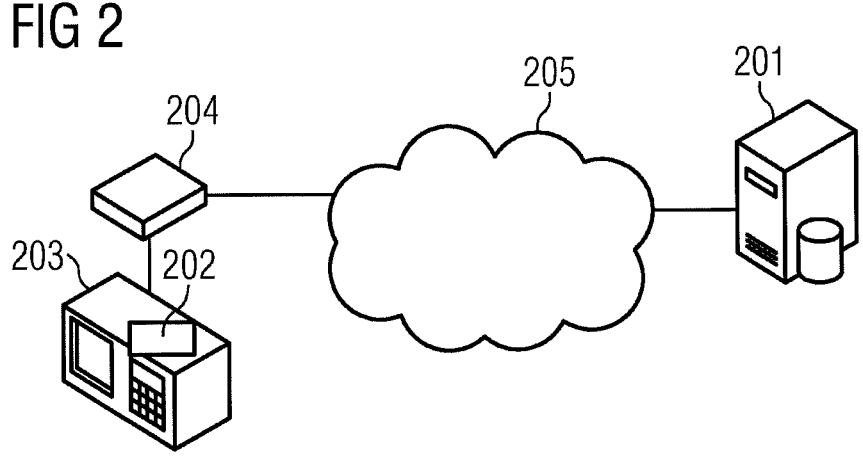
FIG. 2 is a graphic representation of another system having a connection by a network between a verifying entity and an authentication token.

FIG. 2 shows a system having a connection by a network, between a verifying entity and an authentication token. The verifying entity is a computer 201 which is configured, for example, for administering devices via remote access (remote device management). The computer 201 is connected via a network, for example, the internet, to the authentication token 202, which is included in a device 203. The device 203, in turn, is connected via a M2M (machine-to-machine) module 204 to the network 205 and thus to the computer 201.

In the following, a sequence of the method according to the invention will be described from the viewpoint of an authentication token.

At first, a verifying entity transmits a challenge message to the authentication token, which then determines the associated response message. A symmetrical cryptographic key is derived from the response by a key derivation function.

A key derivation function of this type is, for example, a cryptographic hash function such as MD5, SHA1, SHA256 or a function for calculating a message authentication code such as HMAC-MD5, HMAC-SHA1, HMAC-SHA256, AES-CBC-MAC or a CRC (cyclic redundancy check) function. In addition, the identity function can be used directly as a key derivation function, that is, the response message or a part of the response message is used as a key. A further possibility lies in dividing the response into a plurality of blocks that are XOR-linked to one another. If the response message is, for example, 150 bits long, then this is divided into three 50-bit blocks. The three blocks are then XOR-linked to one another again, in order to obtain a 50 bit-long key.

Thereafter, with the aid of the cryptographic key that has been determined, a checksum is determined by the authentication token from the data stored on the authentication token. This checksum is, for example, a message authentication code or a message integrity code, for example, HMAC-MD5, HMAC-SHA1, HMAC-SHA256, AES-CBC-MAC. The data checksum can also be determined in that the data and the key are used as common input data for a checksum function such as MD5, SHA1 or SHA256. The data and the key are then, for example, attached to one another or the key is XOR-linked to the data once the key has been brought to the same length as the data by concatenation.

Since, however, the response message is transmitted unprotected, a hacker could intercept the message and also perform the key derivation. Given knowledge of the derived key, a hacker could then form a data integrity checksum for any data and output the result as authentic data of the authentication token.

Therefore, transmission of the data integrity checksum and of the response message takes place chronologically offset, according to a scheme known to the verifying entity and the authentication token. Firstly, the data integrity checksum is transmitted during a first time window after receipt of a challenge message. Then, the response message is transmitted during a second time window after receipt of the challenge message. The second time window is arranged, overlap-free, after the first time window, for example, separated by a protective chronological distance.

Figure 3:
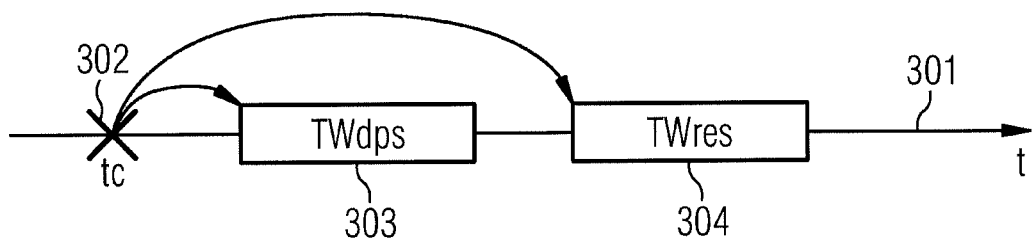
FIG. 3 is a schematic representation of a chronological transmission sequence of data integrity checksum and response.

FIG. 3 illustrates a chronological sequence during transmission of data integrity checksum and response. On the time axis 301, to 302 denotes the time point at which the verifying entity transmits the challenge C to the authentication token. The first time window TWdps 303 represents the time period within which the data integrity checksum DPS is to be received by the verifying entity. The second time window TWres 304 represents the time period within which the response to the transmitted challenge is to be received by the verifying entity.

The sequence of the method will now be described from the viewpoint of the verifying entity.

The verifying entity generates a challenge, for example, a pseudo-random number and transmits the number to the authentication token. The verifying entity then receives the data integrity checksum and the response from the authentication token within the described chronological sequence. If the data is not known to the verifying entity, the entity still receives the data.

Subsequently, a check is made by the verifying entity of whether the data integrity checksum has been received during a first time window and whether the response message has been received during a second time window. It is then checked whether the response message is valid and whether the data matches the received data integrity checksum. If the checks are successful, the authenticity of the authentication token and of the received data from the authentication token is confirmed.

The data from the authentication token is, for example, data stored unalterably on the authentication token or data stored alterably on the authentication token. The data can also be sensor data from a sensor connected to, or integrated into, the authentication token. The data can also be usage data, for example, bits that can be overwritten only once for a use state or a counter for detecting an energy consumption. The data can also include random data. For example, therefore, useful data can be extended with an additional random value generated by a random number generator of the authentication token. This has the advantage that the entirety of the data over which the data integrity checksum is calculated cannot be guessed by a hacker.

A further exemplary embodiment of the method will now be described.

The verifying entity generates a challenge message in that a random number Rand is determined and the challenge is determined by a hash function H(Rand), dependent on the random number Rand.

The challenge message generated is transmitted by the verifying entity to the authentication token. The authentication token determines the response and derives a cryptographic key therefrom. Using the derived cryptographic key, a data integrity checksum is determined with the data provided therefor. As soon as the verifying entity wishes to end the first time window, the entity transmits the random number Rand to the authentication token. In this way, the authentication token is informed that the second time window is beginning.

The authentication token checks whether the random number Rand received fits with the challenge received. For this purpose, the authentication token possesses, for example, the hash function H(Rand) with which the challenge can be generated, based on the received random number Rand.

If the check is successful, the response message is transmitted to the verifying entity. It is thereby ensured that only after receipt of the random number Rand is the response provided. In advantageous manner, the random number Rand, and thus also the start signal for the second time window, can only be transmitted by the verifying entity that has also generated the random number and the challenge. A hacker cannot deduce the random number Rand from a possibly overheard challenge. Since the hash function is a "one-way" function, it is not practicable for an input parameter (Rand), which leads to a particular output value (challenge), to be determined.

This variant of the method has the advantage that no absolute time stipulations have to be observed, but that the end of the validity duration of the cryptographic key generated is stipulated by the protocol. The verifying entity accepts only one data integrity checksum which the entity has obtained before the random number Rand has been made known. Before the random number Rand is made known, an outsider cannot prompt the authentication token to give away the response message and thus indirectly the key derived therefrom. It is therefore also ensured that before the random number Rand is made known, a hacker cannot feed manipulated data to the verifying entity.

FIG. 4 shows, by way of example, a sequence of the method. A verifying entity P 401 generates a challenge C 402 and transmits the challenge to the authentication token AM 403. The verifying entity starts a timer in order to be able to determine the chronological delay with which the two expected messages will be received 402. Alternatively, if a real-time clock is present, the transmission time point is stored. The authentication token determines the response RES 404 associated with the received challenge C, by a stored secret key. Furthermore, the authentication token determines a key K 405 from the response RES, with which a data integrity checksum DPS is calculated 406 using data from the authentication token. The data integrity checksum DPS is transmitted to the verifying entity. There, the checksum is stored together with the time point of receipt 407. The time point relates, for example, to the time point of transmitting the challenge message C, wherein the difference between the two time points is determined with the aid of a timer. Alternatively, the reception time point, which is determined with a real-time clock, is stored.

Due to transmission delays and necessary calculations, the message is received, for example, after 10 ms, 100 ms or 1 s after transmission of the challenge. Following a further delay, for example 10 ms, 100 ms, 1 s or 5 s, the authentication token AM transmits the response message RES to the verifying entity 408. There, the message is stored together with the time point of receipt 409. The time point is determined as described above.

The verifying entity now checks whether the response RES is valid 410. If so, then the verifying entity derives 411 the key Kp therefrom. If the process is correct, the key Kp corresponds to the key K. The verifying entity then determines the data checksum DPSp 412 for the data available to the verifying entity. The data is available, for example, to the verifying entity or have been requested by the authentication token and transmitted unsecured. The verifying entity checks whether the data integrity checksum DPSp determined corresponds 413 to the received data integrity checksum DPS. If so, the data of the authentication token and the data available to the verifying entity are identical.

It is then checked whether the data integrity checksum DPS has been received 414 within the first time window predetermined therefor. It is also checked whether the response RES has been received 415 within the second time window predetermined therefor. If all checks are successful, the data is accepted as valid and unmanipulated 416.

Naturally, the individual checking operations can also be carried out in a different order or in parallel.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for authenticating at least one token, included in an RFID tag, using a challenge-response protocol and protecting integrity of data in the at least one token, using a symmetrical key, comprising:
   generating a challenge by a verifying entity;
   transmitting the challenge to the at least one token at a first time;
   determining a response by the at least one token based on the challenge and a secret key assigned to the at least one token;
   deriving, by the at least one token, a symmetrical key from the response, using a key derivation function;
   determining, by the at least one token, a data integrity checksum from the data and the symmetrical key;
   checking, by the verifying entity, whether the data integrity checksum is received from the at least one token within a first checking time window and the response is received from the at least one token within a second checking time window; and
   authenticating, at the verifying entity, the at least one token and verifying data integrity based on the data integrity checksum, the response, and whether the data integrity checksum is received in the first checking time window and the response is received in the second checking time window;
   wherein the first checking time window begins at a first predetermined offset later than the first time and has a first predetermined duration; and
   wherein the second checking time window begins at a second predetermined offset later than an end of the first checking time window and has a second predetermined duration.

2. The method as claimed in claim 1, further comprising deriving, by the verifying entity, the symmetrical key from the response using the key derivation function, and
   wherein said checking of the data integrity checksum is performed using the symmetrical key derived by the verifying entity.

3. The method as claimed in claim 1, further comprising:
   generating, by the verifying entity, a random number;
   transmitting the random number to the at least one token by the verifying entity to end the first checking time window; and
   checking the random number by the at least one token based on the challenge,
   wherein said generating of the challenge is based on the random number, and
   wherein said transmitting of the response in the second checking time window is performed if said checking of the random number is successful.

4. The method as claimed in claim 1, wherein said generating of the challenge is based on a random number and a hash function.

5. A system, comprising:
   an RFID tag, including at least one token storing data; and
   a verifying entity to:
      generate a challenge and transmit the challenge to the at least one token at a first time,
      receive, from the at least one token, a data integrity checksum within a first checking time window and a response within a second checking time window, the at least one token determining the response based on the challenge and a secret key assigned to the at least one token,
   wherein the at least one token derives a symmetrical key from the response using a key derivation function,
   the at least one token determines a data integrity checksum from the data and the symmetrical key,
   the verifying entity checks whether the data integrity checksum is received from the at least one token within the first checking time window and the response is received from the at least one token within the second checking time window, and
   the verifying entity authenticates the token and verifies data integrity based on the data integrity checksum, the response, and whether the data integrity checksum is received within the first checking time window and the response is received within the second checking time window
   wherein the first checking time window begins at a first predetermined offset later than the first time and has a first predetermined duration; and
   wherein the second checking time window begins at a second predetermined offset later than an end of the first checking time window and has a second predetermined duration.

6. The system as claimed in claim 5, wherein said verifying entity derives the symmetrical key from the response using the key derivation function, and checks the data integrity checksum using the symmetrical key.

7. The system as claimed in claim 5, wherein the first checking time window is completed chronologically before the second checking time window begins.

8. The system as claimed in claim 5,
   wherein said verifying entity generates a random number, then generates the challenge based on the random number and transmits the random number to the at least one token to end the first checking time window, and
   wherein the at least one token checks the random number based on the challenge and transmits the response in the second checking time window if the random number check is successful.

9. The system as claimed in claim 5, wherein said verifying entity generates the challenge based on a random number and a hash function.

10. The method as claimed in claim 2, further comprising:
    generating, by the verifying entity, a random number;
    transmitting the random number to the at least one token by the verifying entity to end the first checking time window; and
    checking the random number by the at least one token based on the challenge,
    wherein said generating of the challenge is based on the random number, and
    wherein the response received is transmitted in the second checking time window if said checking of the random number is successful.

11. The method as claimed in claim 2, wherein said generating of the challenge is based on a random number and a hash function.

12. The method as claimed in claim 3, wherein said generating of the challenge is based on the random number and a hash function.

13. The system as claimed in claim 6, wherein the first checking time window is completed chronologically before the second checking time window begins.

14. The system as claimed in claim 6,
wherein said verifying entity generates a random number, then generates the challenge based on the random number and transmits the random number to the at least one token to end the first checking time window, and
wherein the at least one token checks the random number based on the challenge and transmits the response in the second checking time window if the random number check is successful.

15. The system as claimed in claim 7,
wherein said verifying entity generates a random number, then generates the challenge based on the random number and transmits the random number to the at least one token to end the first checking time window, and
wherein the at least one token checks the random number based on the challenge and transmits the response in the second checking time window if the random number check is successful.

16. The method as claimed in claim 6, wherein said generating of the challenge is based on a random number and a hash function.

17. The system as claimed in claim 7, wherein said verifying entity generates the challenge based on a random number and a hash function.

18. The system as claimed in claim 8, wherein said verifying entity generates the challenge based on the random number and a hash function.

* * * * *

UNITED STATES PATENT AND TRADEMARK OFFICE
CERTIFICATE OF CORRECTION

| | | |
|---|---|---|
| PATENT NO. | : 9,118,643 B2 | |
| APPLICATION NO. | : 13/504874 | |
| DATED | : August 25, 2015 | |
| INVENTOR(S) | : Rainer Falk | |

It is certified that error appears in the above-identified patent and that said Letters Patent is hereby corrected as shown below:

In the claims,

Claim 5, Column 8, Line 21

Delete "the token" and insert --the at least one token--, therefor.

Signed and Sealed this
First Day of December, 2015

Michelle K. Lee
*Director of the United States Patent and Trademark Office*